United States Patent [19]
Vital et al.

[11] 3,749,921
[45] July 31, 1973

[54] CONTROL OF ELECTRONICALLY GENERATED LIGHT PULSES

[75] Inventors: Zoltan Vital, Uccle; Jean Orban, Clabecq, both of Belgium

[73] Assignee: Ponder & Best, Inc., Los Angeles, Calif.

[22] Filed: Mar. 9, 1970

[21] Appl. No.: 17,634

Related U.S. Application Data

[63] Continuation-in-part of Ser. No. 799,554, Feb. 13, 1969, abandoned.

[30] Foreign Application Priority Data
Mar. 7, 1969  Belgium .............................. 71104

[52] U.S. Cl. ............... 250/214 P, 250/227, 250/229
[51] Int. Cl. ............................................ H01j 39/12
[58] Field of Search ................. 250/227, 229, 214 P

[56] References Cited
UNITED STATES PATENTS

| | | | |
|---|---|---|---|
| 3,350,604 | 10/1967 | Erickson | 250/214 P |
| 3,600,584 | 8/1971 | Schneble | 250/214 P |
| 3,611,159 | 10/1971 | Florsheim, Jr. | 250/214 P |
| 3,121,170 | 2/1964 | Norwood | 250/229 |
| 3,185,852 | 5/1965 | Lewis | 250/227 |
| 3,315,082 | 4/1967 | Milroy | 250/227 |
| 3,463,927 | 8/1969 | Allington | 250/227 X |

*Primary Examiner*—Archie R. Borchelt
*Attorney*—Spencer & Kaye

[57] ABSTRACT

Circuits and auxiliary elements for use with a device for controlling the emission of light pulses from a flash unit, which light pulses are produced by the discharge of current pulses from a capacitor, the device including a light sensing element for receiving light produced by the flash unit and reflected from an object in the light path. One such element is constituted by light transmitting lens means having two distinct angles of acceptance extending in the same general direction and transmitting light to one or more light sensing elements. One such circuit includes two zener diodes for providing threshold voltages for use in comparing the output of the light sensing element. Another such circuit compensates for nonlinearities in the response of certain components of the device. Another such element is a special gas filled tube having an internal electrode for triggering conduction through the tube in response to a low voltage. One further element is a special gas filled tube having no internal electrode and constructed to be triggered by receipt of a light emission.

10 Claims, 35 Drawing Figures

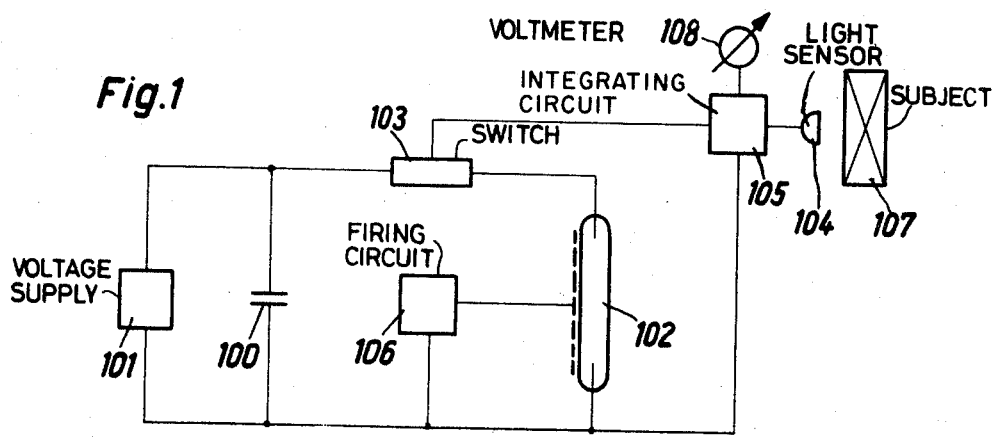
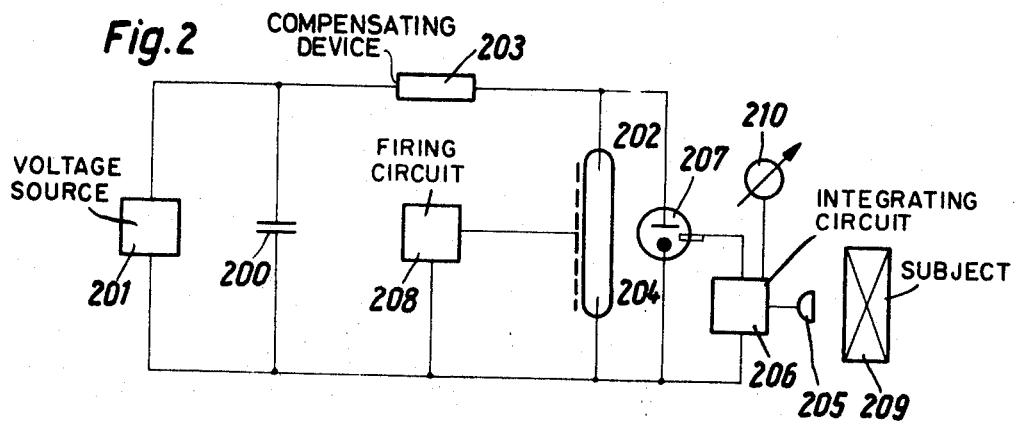
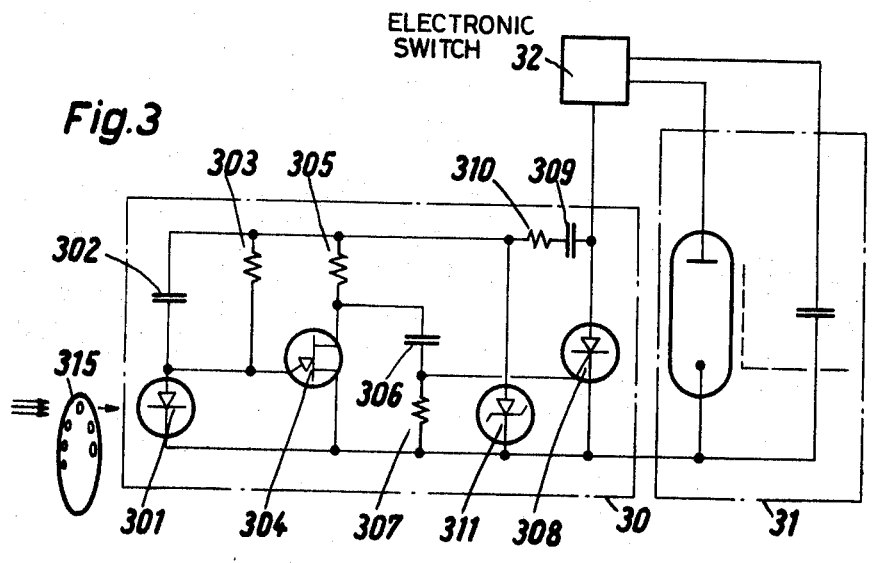

INVENTORS
Zoltan Vital
Jean Orban
BY
Spencer & Kaye
ATTORNEYS.

3,749,921

INVENTORS
Zoltan Vital
Jean Orban
BY *Spencer & Kaye*
ATTORNEYS.

INVENTORS
Zoltan Vital
BY   Jean Orban

Spencer & Kaye
ATTORNEYS.

*INVENTORS*
Zoltan Vital
BY    Jean Orban

*Spencer & Kaye*
ATTORNEYS.

INVENTORS
Zoltan Vital
Jean Orban
BY
Spencer & Kaye
ATTORNEYS.

CONTROL OF ELECTRONICALLY GENERATED LIGHT PULSES

CROSS-REFERENCE OF RELATED APPLICATION

This is a continuation-in-part of our copending application Ser. No. 799,554 filed Feb. 13, 1969, now abandoned.

BACKGROUND OF THE INVENTION

The invention concerns additional novel elements and circuits for use with the devices diclosed in our copending application Ser. No. 799,554, filed Feb. 13, 1969. That application discloses various devices for controlling the impulses generated by the discharge of a capacitor placed either in series or in parallel with a load and, in the case of a parallel connection, having no more than one electronic switch. The pending application also discloses novel switching tubes for uses as such switch.

In known devices of the type here under consideration, reflected light is measured by a light receiver having only one angle of acceptance and provided with but a single light sensitive element.

One drawback of such devices is that when a high contrast scene, or subject, is to be photographed, the reflected light will not be measured with sufficient accuracy. Moreover, when a reflected light measuring and duration control device is used in a camera, and the subject to be photographed is moving and/or the illumination intensity is fluctuating, accurate measurement of the light reflected to the camera with known light measuring devices becomes difficult, and sometimes even practically impossible, and in any case requires a number of complex measurements, computations and evaluations.

SUMMARY OF THE INVENTION

An object of the present invention is to provide an improved measurement, computation and control of the light produced by a flash unit.

One specific object of the present invention is to provide a device for simultaneously measuring reflected light with at least two different angles of acceptance, which device may be provided with one or a plurality of light-sensitive elements. This device is suited for electronic flash instruments, stroboscopes, lasers etc., which are preferably provided with an automatic flash duration control, as well as for still cameras, movie cameras, photographic enlargers, light meters, etc. This method intends to produce a better evaluation, computation and dosaging of the reflected light.

For this purpose, the present invention provides a light metering device which has at least two different angles of acceptance, preferably having different sensitivities — with or without light conductors — and provided with one or a plurality of light receivers, which may be constituted by photodiodes, phototransistors, photoresistors, sun batteries, etc.

When such a device is used in a photographic electronic flash instrument, a stroboscope or laser, etc., each measurement made during the flash duration is transferred, before or after integration, to a computing circuit, performing, for example, addition, subtraction, division, or multiplication operations, or combinations thereof, which produces the control signal to be transmitted to the flash duration control device.

When such a device is employed in a still camera, a movie camera, etc., the control signal is instead transferred to these devices.

Another object of the present invention is a control device for pulses which are produced by the discharge from a capacitor, and which are delivered, for example, to the flash tube of an electronic flash unit. The control device employs two zener diodes as threshold value detectors and which is also provided with a circuit which compensates the time delay of certain components and the fluctuations in the zener voltage of the zener diodes, thereby to permit the flash unit to be controlled at different light intensity settings. This device is supplemented by a photoelectronic remote triggering device provided with a system which permits use even with indirect flashes from the flash unit. Means are provided to permit automatic switching between the devices.

Any of the light control devices described in our copending U.S. application Ser. No. 799,554 may be supplemented with a threshold value detector consisting of two zener diodes, a resistor for the compensation of the delays and variations in certain components, and a switch which permits operation of the light control device with a full light intensity output or a partial light intensity output of the flash unit.

A further object of the present invention is a device for controlling the pulses generated during the discharge of a capacitor and employing a gas-filled switching tube whose interior is provided with one or a plurality of triggering electrodes, which are designed to operate at relatively low voltages, preferably between 50 and 1,000 volts, when compared to similar known devices or is provided with an electrically responsive light generating device which permits the use of a gas-filled tube having only the two main electrodes.

BRIEF DESCRIPTION OF THE DRAWINGS

FIG. 1 is a schematic circuit diagram of a basic circuit with which the improvements according to the present invention can be used.

FIG. 2 is a schematic circuit diagram of another form of construction of the circuit of FIG. 1.

FIG. 3 is a more detailed circuit diagram containing a more detailed showing of one embodiment of a flash duration control circuit.

DESCRIPTION OF THE PREFERRED EMBODIMENTS

Figure 4:
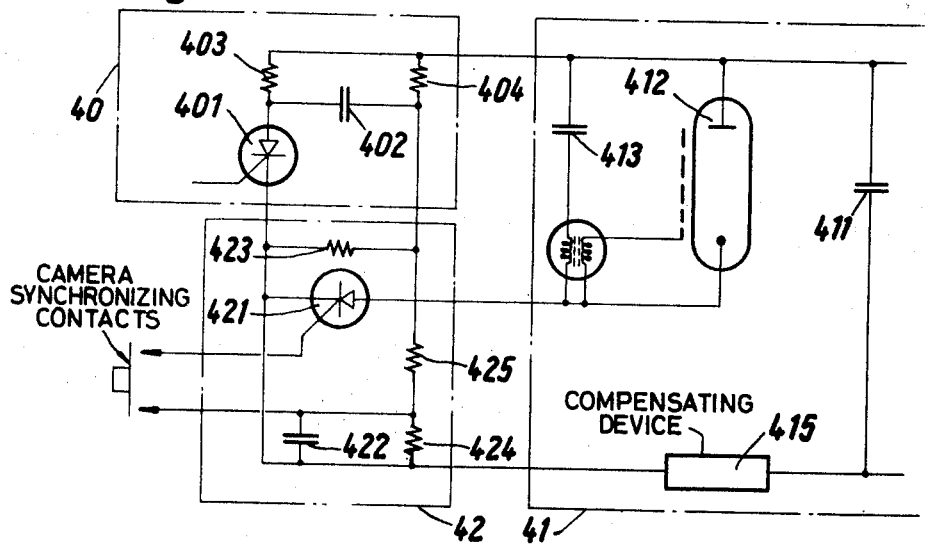
FIG. 4 is a view similar to that of FIG. 3 of another embodiment of a flash duration control circuit.

FIG. 1 shows the circuit of an electronic photoflash equipped with a control device having only one switch whose purpose is to arrest the capacitor discharge when a predetermined amount of light has been produced.

The arrangement of such a unit is as follows.

An energy storage capacitor 100 is charged through a voltage source 101. A flash tube 102 of the usual type is connected to the capacitor terminals through a switch 103 which is preferably a gate-turn-out thyristor or thyratron, etc., provided, if necessary, with suitable supplementary circuitry. A light sensor 104, composed of a photodiode, phototransistor, photoresistance, or other, is connected to an integrating circuit 105 of any well-known type. A firing circuit 106 triggers the firing of the flash tube 102. This device works as follows.

The capacitor 100 having been charged by the source 101, the ionization of the flash tube 102 is induced by the action of the firing circuit 106. The light sensor 104 supplying an instantaneous current proportional to the illumination on subject 107, to the integrating circuit 105, the latter, when the total amount of light received by the light sensor 104 reaches a predetermined value, causes a circuit to "swing", thus supplying an impulse to the switch 103 which then interrupts the discharge of the capacitor 100.

Thus, the light emission of the flash tube is arrested after producing the requisite amount of light, without any energy being withdrawn from the capacitor other than that used for producing the light, and possibly for commutating the circuit.

The arrangement of FIG. 1 may be completed in the following manner: by connecting a voltmeter 108 to the terminals of the integrator circuit 105, which is designed for such a connection, an integrating photometer, or chronometer, can be produced, which device has scales in different measuring units.

Another variant is illustrated in FIG. 2 in which we describe a control device connected both in series and parallel with the load and combined with a compensating device, capable of also being used with the preceding embodiment, constituted by an induction coil.

The discharge capacitor 200 is charged through the voltage source 201. The flash tube 202 is connected to the terminals of the capacitor 200 through the intermediary of the induction coil 203. A thyratron 204 is connected in parallel with the flash tube 202. A light sensor 205 is coupled to the integrating circuit 206, receives reflected light from subject 209 and controls the firing electrode 207 of the thyratron 204. A firing circuit 208 acts to fire the flash tube 202. Meter 210 is connected to circuit 206.

The operation of the circuit of FIG. 2 differs from that of FIG. 1 as follows.

After reaching the predetermined signal value, the circuit of the integrator 206 triggers the firing electrode 207 of the thyratron 204 in parallel with the flash tube 202. The induction coil 203 allows for a short period during which the thyratron is practically in short-circuit. Consequently, the flash tube 202 has enough time to deionize, and hence to become extinguished.

A modification is illustrated in FIG. 3. This control device is combined with both an electronic gate and an optical device of regulation of the sensitivity.

Figure 5:
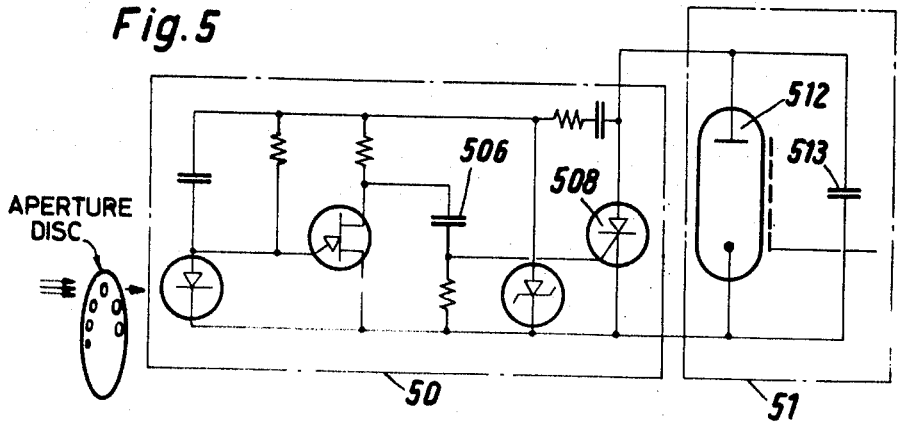
FIG. 5 is a view similar to that of FIG. 3 of still another embodiment of a flash duration control circuit.

The control device consists of an electronic device 30 which is identical with the device 50 of FIG. 5, of the photoflash unit 31 and of an electronic switch 32.

In this device, a light sensor 301 generates a current proportional to the relfected light from the subject. This current is integrated by a capacitor 302 to give a voltage proportional to the amount of the reflected light. This voltage is applied to a unijunction transistor 304 or to a four-layer diode or to some other element or device which would serve as suitable substitute, which develops a positive impulse in the resistance 305 as soon as the threshold swing or switching level, of this component 304 has been reached.

This impulse is conducted by the capacitor 306 to open a semiconductor switch, or other element, 308 by means of its firing circuit which controls the electronic switch 32 so as to terminate the capacitor discharge and thereby extinguish the flash tube of the photoflash 31.

As soon as the cycle is ended, the voltage across a resistance 303 sets the system back to its initial condition. A resistance 307 prevents a premature opening of the semiconductor switch 308. The unit 31 contains the elements of the photoflash which are not individually referenced. The electronic device 30 contains as its principal element a semiconductor switch, such as a thyristor (SCR), or else a gas-filled switching tube, preferably of the arc arrester type or a special arc arrester, or another suitable component.

An improvement of the flash control device consists in equipping this device with an electronic gate which acts upon the reflected light sensor circuit.

FIG. 3 also illustrates the electronic gate arrangement. When the flash tube is fired, the voltage at the flash tube terminals decreases sharply. This results in a current in the circuit of the capacitor 309, the resistance 310 and the zener diode 311. A voltage equal to that across the zener diode is to appear at the terminals of the light sensor circuit so as to place it in operation. The current intensity depends on the resistance value of resistor 310. The opening duration of the electronic gate of the light sensor circuit depends on the value of the capacitor 309.

The regulation of the sensitivity of the control device is effected by the user with the help of an adjustable optical device 315 composed of a diaphragm, a set of filters, or others, placed in front of the light sensor 301 of the control device.

A further explanation is given with reference to FIG. 4 which shows a light control device for the flash of an electronic photoflash, consisting of the electronic device 40, which is similar to the device 30 of FIG. 3 and the device 50 of FIG. 5 and which is therefore only partially shown, of the photoflash 41, which is similar to the device 31, and of an electronic switch 42, which is similar to the device 32, connected in series with the flash tube circuit.

This device and its operation are essentially identical to those described and illustrated previously, namely:

The thyristor 421, which is fired upon closing of the camera synchronization contacts, applies the voltage of the discharge capacitor 411 across the flash tube 412, the latter having received previously a fraction of this voltage, the value of which fraction is determined by the resistances 404 and 423, and to the tube firing circuit consisting of a capacitor 413 and a transformer 414, thus firing the flash. When the thyristor 401 becomes conductive due to the subject having been sufficiently illuminated, it discharges the capacitor 402, which was previously charged, into the thyristor 421, which results in reversing the anode voltage of the thyristor for a short period so as to cause it to block and thus arrest the discharge of the capacitor 411. The capacitance value of the capacitor 402 is selected so as to obtain an impulse of sufficient duration to allow the extinction, or blocking, of the thyristor 421. The capacitance value of the capacitor 422 is selected so as to obtain the shortest possible impulse so that the extinction of the thyristor 421 may occur as rapidly as possible. The resistances 424 and 425 are used to polarize the capacitor 422. The value of resistance 403 must be selected in order to give a current lower than the maintenance current of the thyristor 401 so as to prevent the capacitor 411 from continuing to discharge itself through the thyristor 401. A compensation device, such as an induction coil, 415 modifies the discharge impulse in the flash tube. Among other things, it lengthens the discharge duration, etc.

FIG. 5 shows a control device combined with an electronic gate and with an optical device for the regulation of sensitivity. This control device consists of an electronic device 50 and the photoflash 51.

The components and operation of this device are identical to those described with reference to FIG. 3, with the difference that an impulse transmitted by the capacitor 506 opens a semiconductor switch, or a special arc arrester, etc., 508, via its firing circuit and thereby extinguishes the flash tube 512 of the photoflash while discharging the capacitor 513 of the latter.

Figure 6:
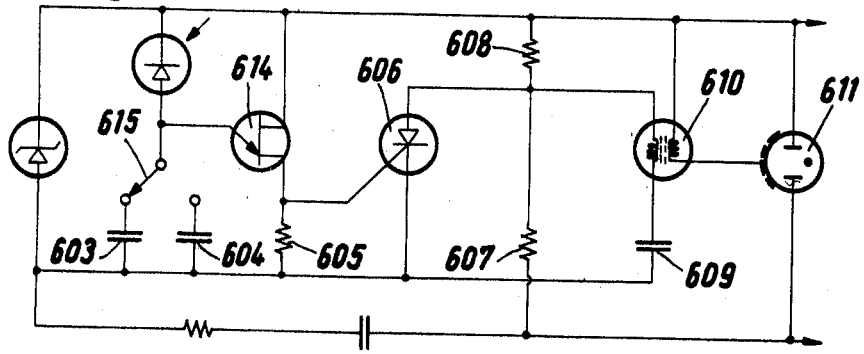
FIG. 6 is a view similar to that of FIG. 3 of yet another form of construction of a flash duration control circuit.

In FIG. 6, we describe another embodiment equipped with a special arc arrester combined with an electronic gate and with an electric device having several capacitors for the regulation of sensitivity. A special arc arrester 611 and its firing device, which consists of the thyristor 606, the resistances 607 and 608, the capacitor 609 and the transformer 610, serve as a substitute for the thyristor 508 of FIG. 5. Here, we make use of an electric circuit for adjusting the sensitivity, the circuit consisting of a switch 615 connected to select one of the capacitors 603 and 604 having different capacitance values.

Figure 7:
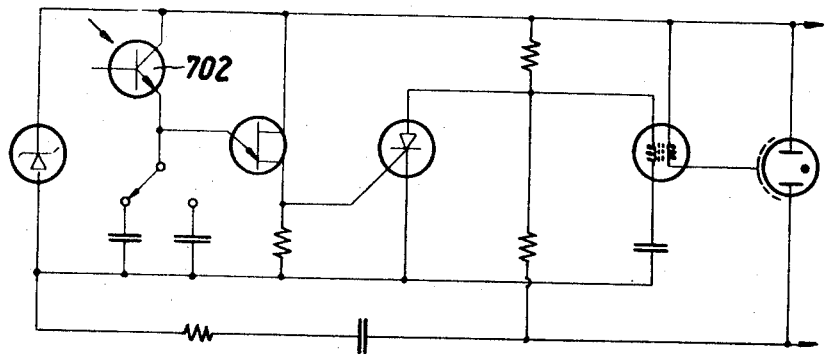
FIG. 7 is a view similar to that of FIG. 3 of a further form of construction of a flash duration control circuit.
Figure 8:
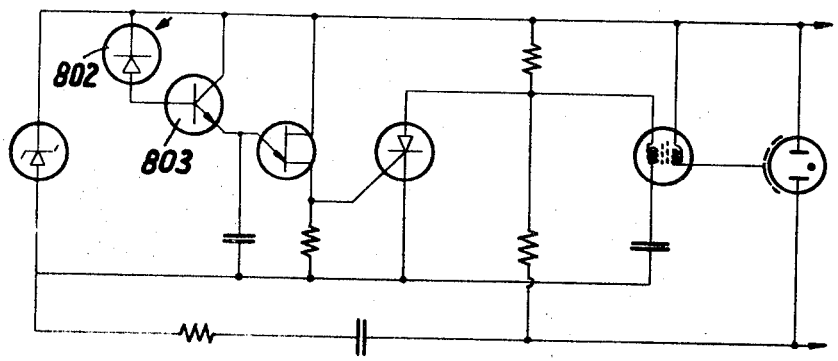
FIG. 8 is a view similar to that of FIG. 3 of yet a further embodiment of a flash duration control circuit.

In FIG. 7 there is shown another embodiment in which the photodiode is replaced by a phototransistor 702 in order to give a higher sensitivity to the light integrator than is possible with the photodiode. In FIG. 8 the photodiode 802 has an amplification circuit composed essentially of an npn transistor 803 which allows the selection of a very high sensitivity, as a function of the gain of the transistor.

Figure 9:
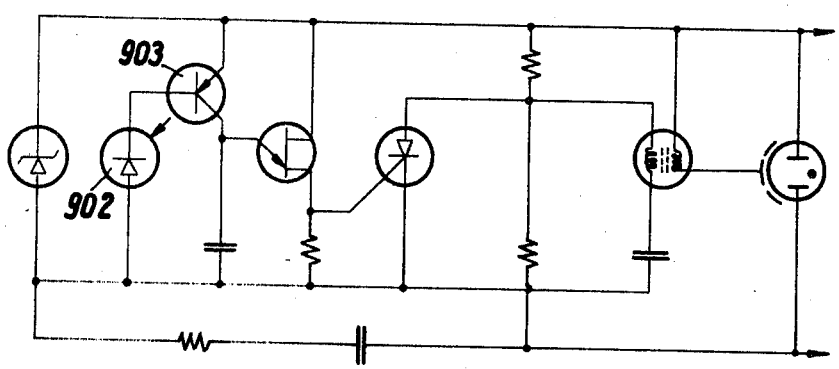
FIG. 9 is a view similar to that of FIG. 3 of a still further embodiment of a flash duration control circuit.

In FIG. 9 a pnp transistor 903 replaces the npn transistor.

Figure 10:
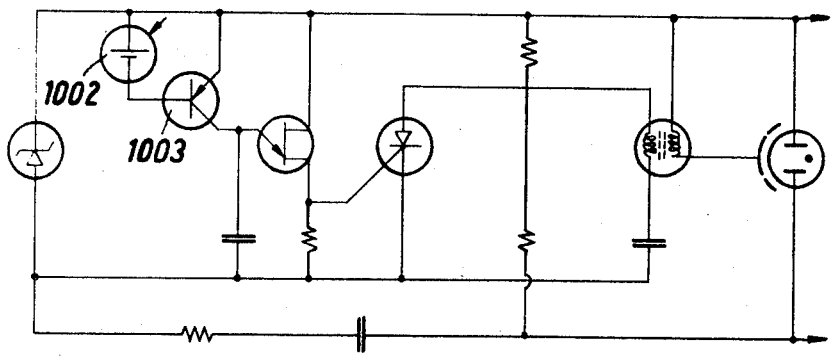
FIG. 10 is a view similar to that of FIG. 3 of an additional embodiment of a flash duration control circuit.

In FIG. 10 the light sensor is a photovoltaic cell, such as a solar cell, etc., 1002, the current of which is amplified by a transistor 1003.

Figure 11:
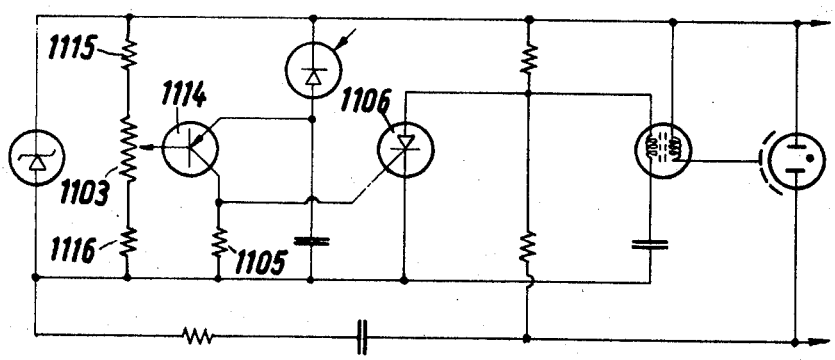
FIG. 11 is a view similar to that of FIG. 3 of a further additional flash duration control circuit.

In FIG. 11 the firing of the thyristor 1106 is effected by a threshold amplifier which consists of the transistor 1114 and the resistances 1103, 1105, 1115 and 1116. The switching threshold may be adjusted or regulated internally and/or externally by means of the resistance 1103. The threshold voltage determines the control device sensitivity.

Figure 12:
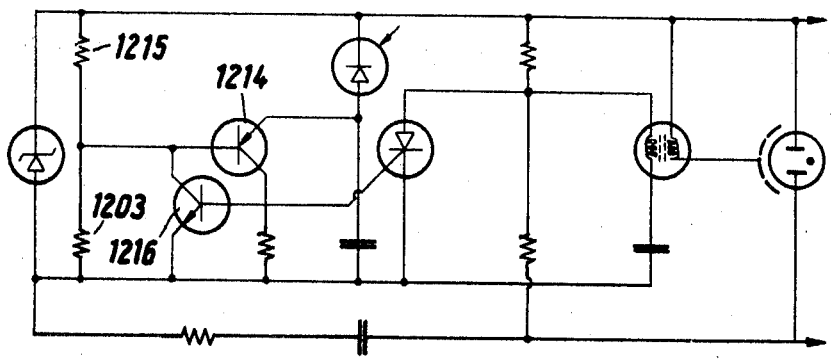
FIG. 12 is a view similar to that of FIG. 3 of another additional embodiment of a flash duration control circuit.

In FIG. 12 the threshold amplifier contains two transistors 1214 and 1216. The switching threshold may be adjusted by selecting suitable values for the resistances 1215 and 1203.

FIGS. 1–12 are disclosed in our copending parent application.

There will now be described various embodiments of the present invention.

Figure 13:
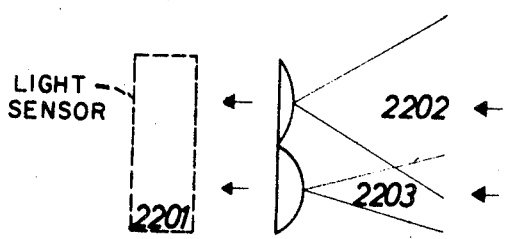
FIG. 13 is a pictorial view of one embodiment of a dual field light receiver according to the invention.

FIG. 13 shows a light sensor 2201 which is provided with two ancillary lenses, or lens systems, 2202 and 2203 having respectively different angles of acceptance, as illustrated, for light traveling in the direction of the arrows. The light gathered by each lens is conveyed, still in the form of light, to light-sensitive element 2201 where it is converted into electrical signals in a well-known manner.

Figure 14:
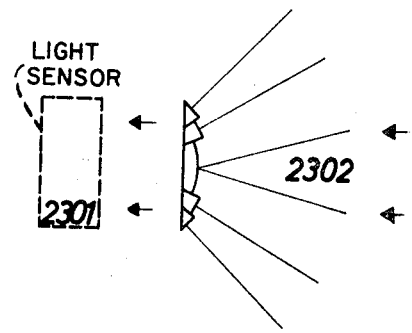
FIG. 14 is a view similar to that of FIG. 13 of another embodiment of the light receiver.

FIG. 14 shows a light-sensitive element 2301 with one ancillary lens or lens system 2302 having three different focal lengths, or angles of acceptance.

Figure 15:
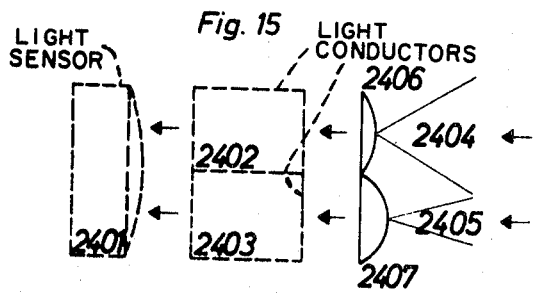
FIG. 15 is a view similar to that of FIG. 13 of a further embodiment of the light receiver.

FIG. 15 shows a light-sensitive element 2401 which is disposed behind two light conductors 2402 and 2403, which may be constituted by optical fibers, transparent material, etc. Lenses 2406 and 2407, possibly having respectively different light attenuation characteristics and in any case having respectively different angles of acceptance 2404 and 2405 are placed in front of the light conductors.

Figure 16:
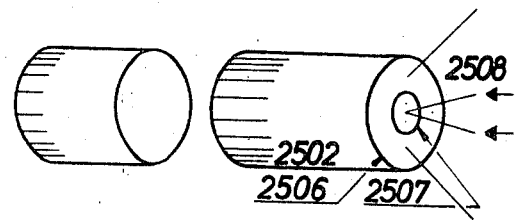
FIG. 16 is a view similar to that of FIG. 13 of yet another embodiment of the light receiver.

FIG. 16 shows substantially the same arrangement as FIG. 15, except that only one light conductor 2502 is employed, a bifocal lens 2506 being placed therein-front and having two portions 2507 and 2508 with respectively different radii of curvature and angles of acceptance, and possibly respectively different optical attenuation characteristics.

Figure 17:
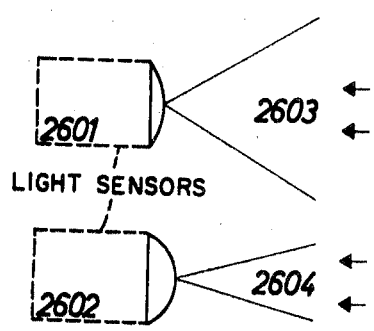
FIG. 17 is a view similar to that of FIG. 13 of still another embodiment of the light receiver.

FIG. 17 shows a device with two light-sensitive elements 2601 and 2602 provided with respective lenses 2603 and 2604 having respectively different diameters and angles of acceptance.

Figure 18:
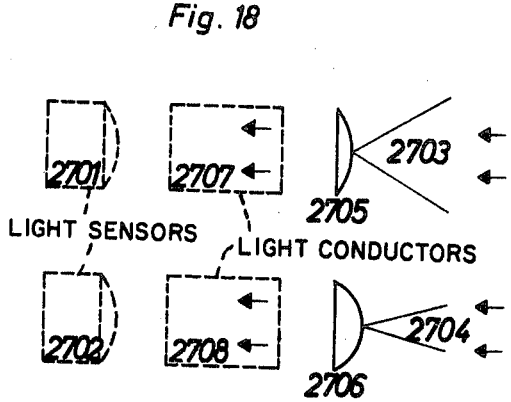
FIG. 18 is a view similar to that of FIG. 13 of still a further embodiment of the light receiver.

FIG. 18 shows an arrangement similar to that of FIG. 17 but with two light-sensitive elements 2701 and 2702 having the same angle of acceptance disposed behind an optical device consisting of two lenses 2705 and 2706 with respectively different angles of acceptance 2703 and 2704 and two light conductors 2707 and 2708.

Figure 19:
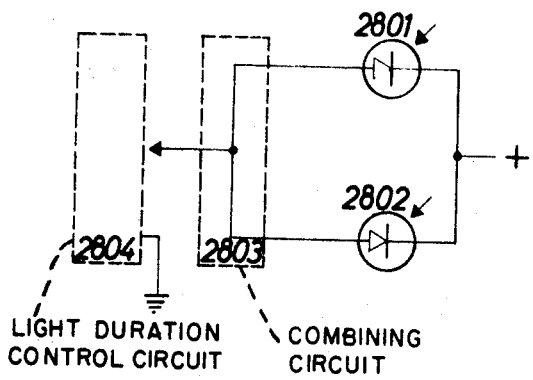
FIG. 19 is a circuit diagram of a light sensor arrangement according to the present invention.

FIG. 19 shows one embodiment of a combining circuit 2803 which algebraically adds the two partial currents from the two parallel-connected light-sensitive elements 2801 and 2802, here shown as two photodiodes. The circuit 2804 contains the remaining circuit elements. The two photodiodes are arranged to each receive light from a respective one of the two lenses of FIGS. 13, 15, 17 or 18, or from a respective portion of the composite lenses of FIGS. 14 and 16.

Figure 20:
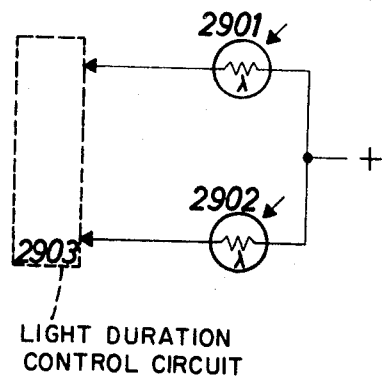
FIG. 20 is a view similar to that of FIG. 19 of another light sensor arrangement.

FIG. 20 shows substantially the same arrangement as FIG. 19, but the two light-sensitive elements 2901 and 2902 are photoresistors which, in the embodiment of an electronic flash unit also themselves perform the light integration operation and are followed by a light duration control circuit 2903.

The resistance of each photoresistor corresponds during the duration of a flash to the amount of light received at each instant.

Figure 21:
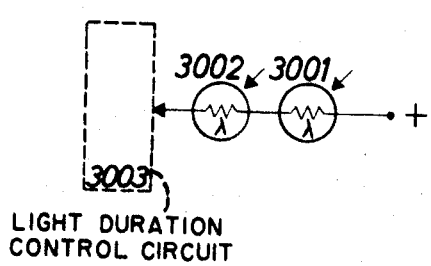
FIG. 21 is a view similar to that of FIG. 19 of still another light sensor arrangement.

FIG. 21 corresponds essentially to FIG. 20 except that the two photoresistors 3001 and 3002 are connected in series with control circuit 3003.

Figure 22:
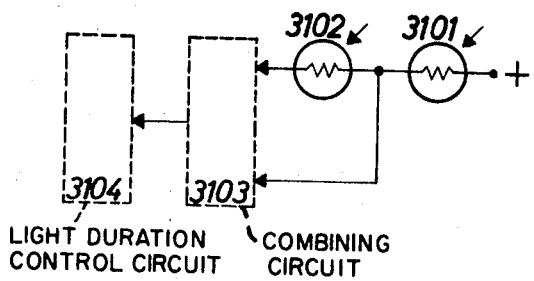
FIG. 22 is a view similar to that of FIG. 19 of a further sensor arrangement.

FIG. 22 is similar to FIG. 21, except that the signal of one of the two photoresistors 3101 is additionally fed to a separate input of the computing circuit 3103. The circuit 3104 contains the other elements.

Figure 23:
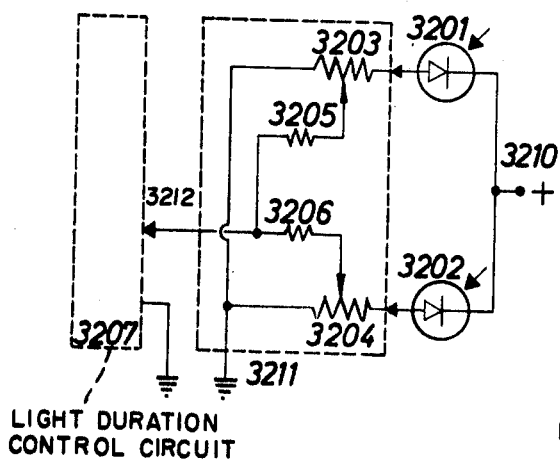
FIG. 23 is a view similar to that of FIG. 19 of yet a further sensor arrangement.

FIG. 23 corresponds substantially to FIG. 19, except that the combining circuit contains a voltage divider which consists of potentiometers 3203 and 3204 and fixed resistors 3205 and 3206, having their common junction connected to control circuit 3207. Thus, the effective sensitivity of the two light-sensitive elements 3201 and 3202 can be separately regulated.

Figure 24:
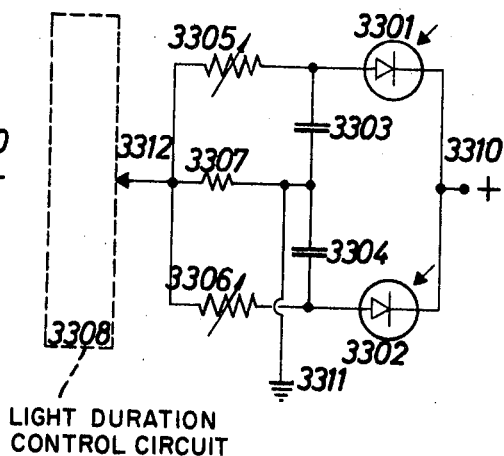
FIG. 24 is a view similar to that of FIG. 19 of a still further sensor arrangement.

FIG. 24 shows an automatic light duration control device which is provided with two light-sensitive elements 3301 and 3302. Each light-sensitive element has its own integration circuit which consists of a respective one of the capacitors 3303 and 3304. The capacitor voltages are applied to respective ones of the two voltage dividers which are formed of the variable resistors 3305 and 3306 and the fixed resistor 3307. The two voltage dividers have a common output terminal connected to control circuit 3308.

The voltage of the fixed resistor 3307 is applied to a threshold value amplifier which is disposed in circuit 3308 together with the other elements of the light duration control device.

The arrangements illustrated in FIGS. 19-24 can be substituted for the light-sensitive element assemblies of the circuits of FIGS. 1-12. For example, the elements 2801, 2802 and 2803 of FIG. 19 or the elements 3001 and 3002 of FIG. 21 could simply be "plugged in" in place of the light sensor of any of the circuits of FIGS. 1-12. The embodiment of FIG. 23 could be connected in the circuit of FIG. 11 by removing the light sensor of the latter figure, connecting terminal 3210 of FIG. 23 to the upper power supply conductor of FIG. 11, connecting FIG. 23 terminal 3211 to the capacitor shown in FIG. 11 to be connected in series with the light sensor, and connecting FIG. 23 terminal 3212 to the emitter of amplifier transistor 1114 of FIG. 11. The embodiment of FIG. 24 could be connected in the circuit of FIG. 11 in a similar manner, but in this case both the light sensor and its series integrating capacitor of FIG. 11 would be removed. The embodiments of FIGS. 23 and 24 could similarly be incorporated in the circuits of FIGS. 1-10 and 12.

Figure 25:
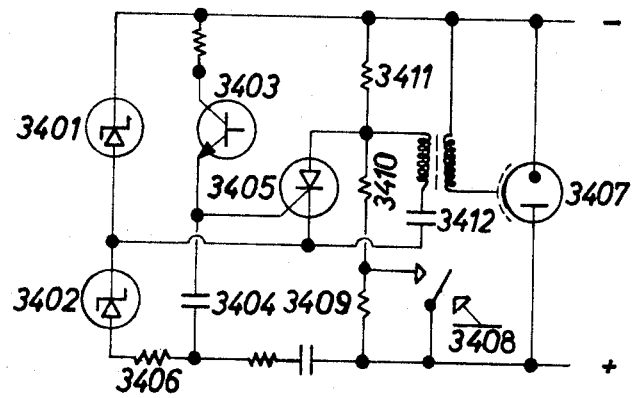
FIG. 25 is a circuit diagram of a modified light duration control circuit according to the invention.

FIG. 25 illustrates one embodiment of a circuit possessing other novel features according to the invention. In this case two zener diodes 3401 and 3402 are employed in a series connection so that the total voltage across them determines the supply voltage of the light-sensing phototransistor 3403. The voltage across the zener diode 3402 alone determines the value which the voltage across the integration capacitor 3404 must reach in order to fire the thyristor 3405.

The circuit includes a resistor 3406 across which is produced a voltage proportional to the nonlinearity error of the control device, which error is caused by voltage fluctuations of the zener diodes 3401 and 3402, by the switching delays of the thyristor 3405 and by the arc arrester 3407. The resistor 3406 is connected in such a way as to compensate this error.

When thyristor 3405 fires, i.e., becomes conductive, it causes capacitor 3412 to discharge through the primary winding of a transformer 3413 whose secondary winding is connected to arrestor 3407. The voltage to which capacitor 3412 is charged prior to the firing of thyristor 3405 is determined in part by the value of resistors 3409, 3410 and 3411.

A switch 3408 is connected across resistor 3409 and when this switch is opened resistors 3409, 3410 and 3411 determine the voltage of the firing capacitor 3412, corresponding to the full power output of the flash.

When switch 3408 is closed, only the resistors 3410 and 3411 determine the voltage of the firing capacitor corresponding to a partial power output from the flash.

According to another feature of the invention, the light control device of an electronic flash unit can be supplemented to give it the capability of initialling functioning as a light responsive flash trigger device, or slave unit, and then automatically switching to function as a light duration control unit. This combined device is so constructed that it performs the automatic switching between the two modes of operation. This device preferably employs a single light-sensitive element to initiate the two functions, and possibly further common components. This means that during its periods of use as a remote triggering device, the light-sensitive element is not conducting an electric current and thus operates as a simple photovolltaic element or the like, whereas during the period when it operates as a flash control device, the light-sensitive element is connected to an electric current supply and thus operates as a photodiode or the like.

Figure 26:
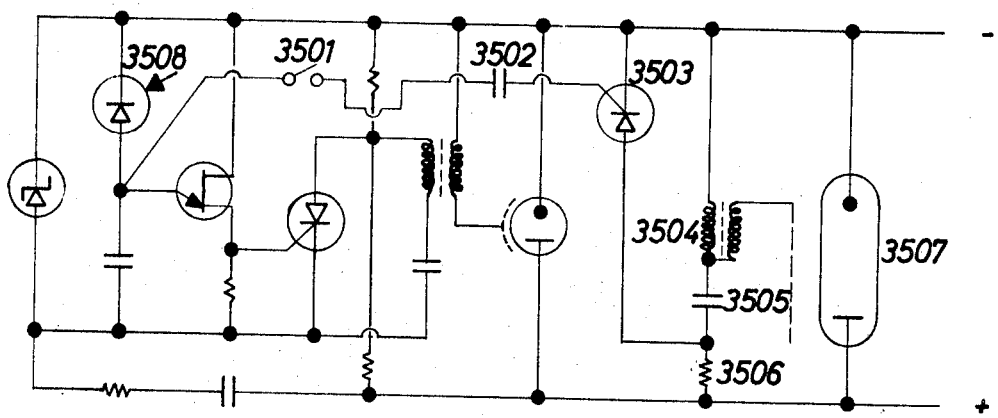
FIG. 26 is a circuit diagram of a control circuit according to the invention for controlling both the initiation and termination of a light flash.

FIG. 26 illustrates one exemplary embodiment of such a device in which the circuit substantially illustrated in FIG. 6 is supplemented with the following components:

a switch 3501 for connecting or disconnecting the remote triggering device and a capacitor 3502 connected in series between the light-sensitive element 3508 and the gate electrode of a thyristor 3503, as well as other components present in a conventional electronic flash assembly, such as the firing transformer 3504, the firing capacitor 3505, the resistor 3506 and the flash tube 3507, thyristor 3503 being connected across the series arrangement of capacitor 3505 and transformer 3504.

The device operates as follows.

When switch 3501 of the light duration control device of the flash unit is closed, the photoelectric remote triggering device is also rendered operative. The light-sensitive element operates in this case principally as a photoelement without any steady-state electric current.

In this mode of operation, when the light from an external main flash instrument reaches the photoelement 3508 of the slave flash unit, it produces a voltage pulse which triggers the thyristor 3503 via the switch 3501 and capacitor 3502, and thus the flash tube 3507 of the flash unit.

Thereafter, the light duration control device operates in the same manner as it was described in connection with FIG. 6, i.e. the electric current supply for the light receiver 3508 which now operates as a photodiode, is supplied with an operating voltage and can no longer operate as a remote triggering device as long as that current supply is not interrupted, which does not occur until the end of the flash being produced by its flash unit.

On the other hand, when the switch 3501 is open, only the light duration control function will be performed.

In case it is desired to produce an "indirect" flash, i.e. the flash unit is directed toward the ceiling or the wall, the light-sensitive element of a known light duration control device would receive reflected light form the ceiling or the wall, but not from the subject being photographed, so that the control device would not be responsive by the illumination of the subject being photographed.

To avoid these difficulties the present invention provides the use of one or a plurality of light-sensitive elements whose position may be adjustable and which may be provided with light conductors, which themselves may also be adjustable. The setting of these elements may occur manually or automatically.

Figure 27:
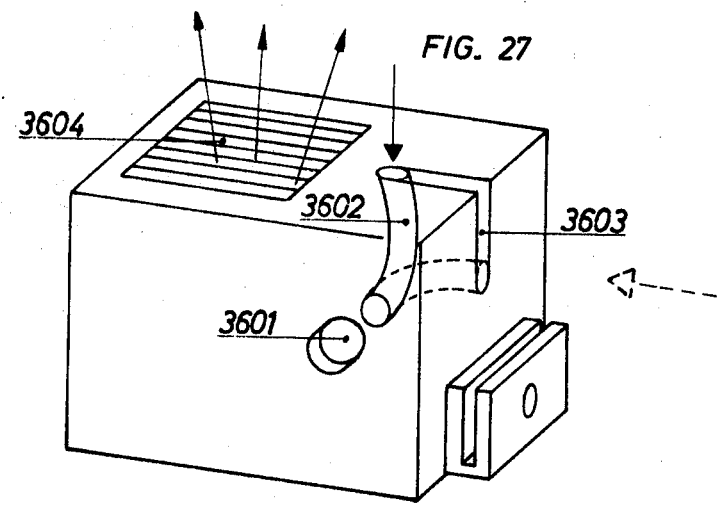
FIG. 27 is a perspective view of an automatically controlled flash unit according to the invention which can contain the circuit of FIG. 26.

FIG. 27 shows an electronic flash unit incorporating such an arrangement. The unit is capable of being oriented to produce a direct flash or a bounce flash. The light beam of the flash is directed and shaped in the usual manner by a lens 3604. The reflected light to be measured is received by an optical fiber element 3602 whose front face is directed toward the source of reflected light to be measured and whose rear face is directed toward the light sensitive element 3601 of a control circuit according to the invention. The front face of element 3602 is aligned with a slot 3603 in the unit housing and is connected to any suitable mechanical arrangement (not shown) for undergoing a pivotal movement to direct its front face toward the light to be measured. For direct flash, the element 3602 has the position indicated in solid lines and receives light coming in the direction of the solid arrow; for bounce flash where the unit radiates light at right angles to the subject, unit 3602 has the position shown in broken lines and senses light coming from the subject in the direction indicated by the broken-line arrow. For intermediate bounce flash directions, unit 3602 can be placed in any intermediate position between the two extremes illustrated.

In the case where the device contains a plurality of light-sensitive elements which are oriented in different directions, the selection of the light-sensitive element or elements employed can be made by electric, electronic, optical, or mechanical means, etc. The selection may be manual and/or automatic.

Figure 28:
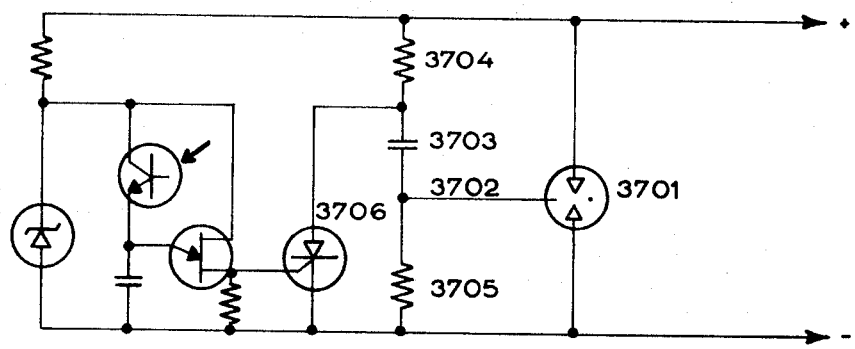
FIG. 28 is a circuit diagram of a control circuit according to the invention employing a low voltage activated gas-filled tube.

FIG. 28 shows a control circuit similar to those previously described and employing a gas-filled switching tube 3701 which is provided with an internal low voltage control or triggering electrode 3702.

The capacitor 3703 is connected to be charged by resistors 3704 and 3705 to the voltage which is applied to the terminals of the gas-filled switching tube 3701. When thyristor 3706 is fired, the voltage to which capacitor 3704 has been charged is applied to the internal low voltage control electrode 3702 of the gas-filled switching tube 3701, so that it is also fired. The thyristor 3706 is connected in a circuit identical with that shown in FIG. 7.

Figure 29:
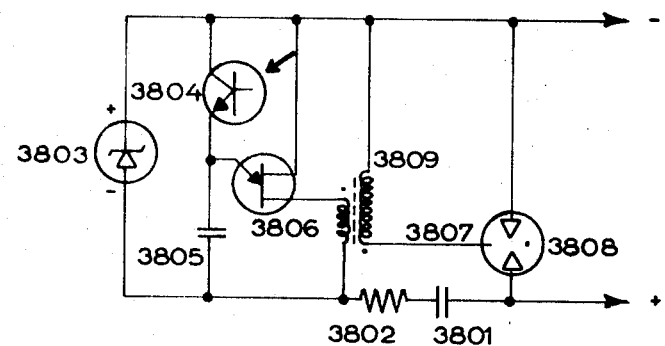
FIG. 29 is a view similar to that of FIG. 28 of another embodiment of such circuit.

FIG. 29 shows a circuit employing gas-filled switching tube 3808 provided with an internal low voltage control electrode 3807 which is controlled by a low voltage pulse transformer 3809 which is in turn directly controlled by a unijunction transistor 3606. Capacitor 3801, resistor 3802 and zener diode 3803 form an electronic current gate which functions in the same manner as elements 309, 310 and 311 of FIG. 3.

The phototransistor 3804, the capacitor 3805 and the unijunction transistor 3806 form the integrator and threshold value detector, which operate in the same manner as the corresponding elements shown in FIG. 7. The pulse generated by unijunction transistor 3806 is transmitted by the pulse transformer 3809 to the internal low voltage control electrode 3807 of the gas-filled switching tube 3808.

Figure 30:
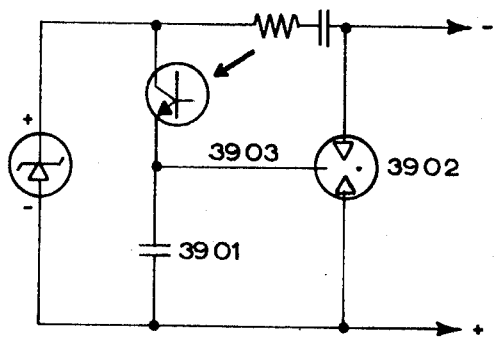
FIG. 30 is a view similar to that of FIG. 28 of a further embodiment of such circuit.

FIG. 30 shows a highly simplified control circuit including a gas-filled switching tube 3902 provided with an internal low voltage control electrode 3903 directly controlled by the integration capacitor 3901. The terminal voltage of the integration capacitor 3901 controls the firing of the gas-filled switching tube 3902 when a sufficient quantity of light has reached phototransistor 3904, directly through the internal low voltage control electrode 3903.

Figure 31:
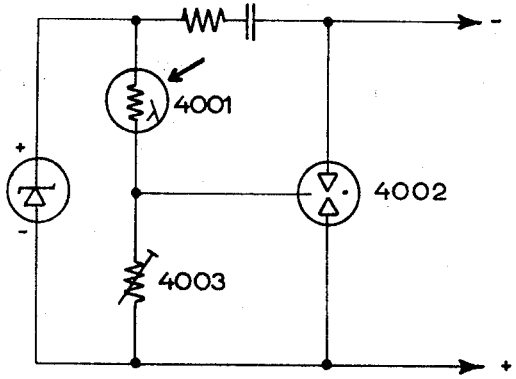
FIG. 31 is a view similar to that of FIG. 28 of a further embodiment of such circuit.

The circuit of FIG. 31 is substantially the same as that of FIG. 30 except that the internal low voltage control electrode of the gas-filled switching tube 4002 is controlled directly by a photoresistor 4001 which simultaneously serves as the light integrator. The control voltage of the internal electrode of the gas-filled switching tube 4002 is obtained at the terminals of a variable resistor 4003.

Figure 32:
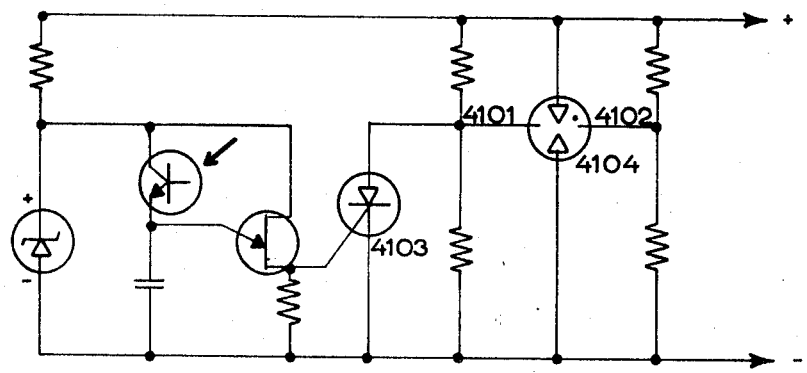
FIG. 32 is a view similar to that of FIG. 28 of a still further embodiment of such circuit.

FIG. 32 shows a circuit employing a gas-filled switching tube 4104 provided with two internal low voltage control electrodes 4101 and 4102 one of which is polarized by a voltage divider at a fixed voltage whereas the other is controlled in the same manner as the control electrode of the circuit of FIG. 28. In the quiescent state, the voltages at the two internal control electrodes 4101 and 4102 are identical.

When the thyristor 4103 fires, there results an inequality between these two voltages. This inequality has the effect of firing the gas-filled switching tube 4104. Otherwise this circuit is the same as that of FIG. 28.

Figure 33:
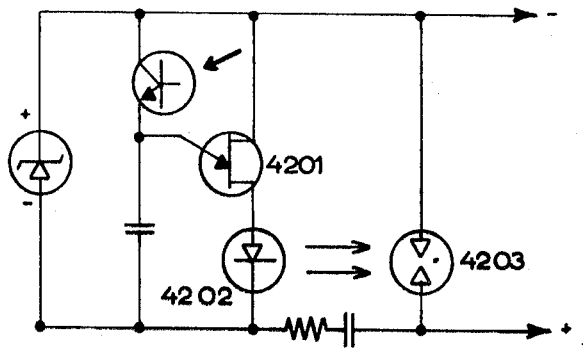
FIG. 33 is a view similar to that of FIG. 28 of yet another embodiment of such circuit.

The circuit of FIG. 33 employes a gas-filled tube 4203 without any internal or external control electrode. The firing of the tube is controlled by an electrically responsive light generating element, e.g. by a gallium arsenide diode. This apparatus operates in principle in the same manner as the circuit shown in FIG. 29, except that the pulse of the unijunction transistor 4201 controls a light emitting diode 4202 whose light pulse is directed toward the gas-filled switching tube 4203 and initiates its firing.

Figure 34:
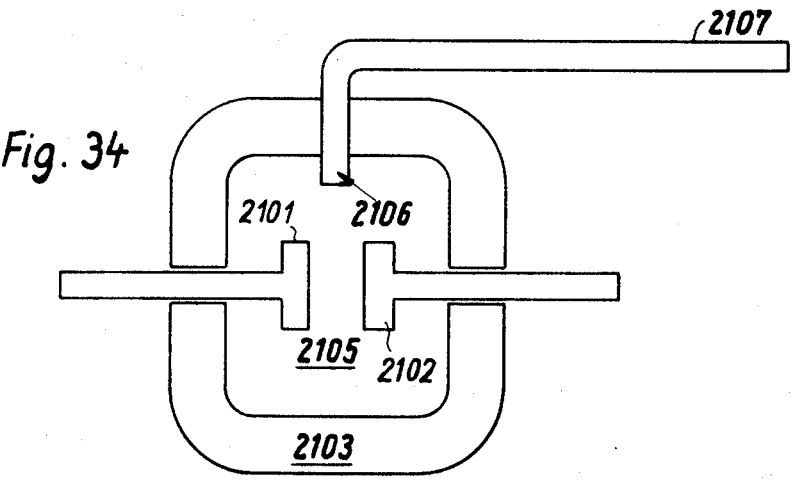
FIG. 34 is an elevational view of one embodiment of the gas-filled tube employed in the embodiments of FIGS. 28–31.

In FIG. 34 there is shown one embodiment of the above-mentioned special gas-filled tube of the arc arrester type. This consists of an electrically isolating enclosure 2103, which can be transparent, translucent or opaque, whose interior 2105 is filled with a gas, preferably argon, and contains two preferably identical and unpolarized electrodes 2101 and 2102. A third firing electrode 2106 protrudes into the interior 2105 of the enclosure 2103 and is extended by the connecting wire 2107. The electrodes 2101 and 2102 are located and formed in such a way, and the filling and the pressure of the gas are chosen in such a manner, that this tube will function to perform an arc operation.

Figure 34A:
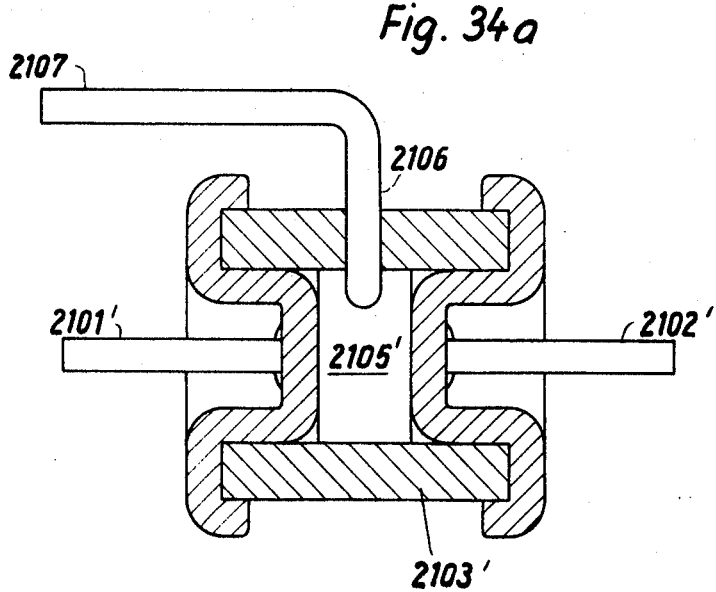
FIG. 34a is a cross-sectional view of a modified form of construction of the embodiment of FIG. 34.

As can be seen from FIG. 34a, which shows a modified embodiment of the device of FIG. 34, the enclosure 2103' is formed in the shape of a tube and is delimited by two electrodes 2101' and 2102' of the "socket" type, and of large surface area. The length of this tube is about the same as its diameter.

It will be understood that the above description of the present invention is susceptible to various modifications, changes and adaptations and the same are intended to be comprehended within the meaning and range of equivalents of the appended claims.

We claim:

1. A light sensing device for use in an automatic photoflash comprising in combination:
   a. light receiving lens means having two different angles of acceptance, the bisectors of which angles extend parallel to one another; and
   b. light responsive means optically associated with said lens means for receiving the light associated with both of said angles of acceptance and producing an electrical output signal proportional to the time integral of the total received light.

2. An arrangement as defined in claim 1 further comprising optical fiber means optically linked between said lens means and said light responsive means.

3. An arrangement as defined in claim 1 wherein said light responsive means includes a light-to-electric signal transducer, said arrangement further comprising an electronic computing circuit connected to receive the output of said light responsive means.

4. An arrangement as defined in claim 3 wherein there are two such transducers having their electrical outputs connected together in parallel.

5. An arrangement as defined in claim 3 wherein there are two such transducers having their electrical outputs connected together in series.

6. An arrangement as defined in claim 3 wherein there are two such transducers having their electrical outputs connected together in both series and parallel.

7. An arrangement as defined in claim 3 wherein said transducer is an integrating device which produces an output signal proportional to the time integral of the light which it receives.

8. An arrangement as defined in claim 3 wherein there are a plurality of such transducers each producing an electrical output signal porportional to the time integral of the light which it receives.

9. An arrangement as defined in claim 8 wherein said electronic computing circuit is connected to the output of each of said transducers.

10. An arrangement as defined in claim 9 wherein said computing circuit is constituted by a light duration control device for controlling the duration of the flashes produced by the photoflash in response to the light received by said lens means.

* * * * *